US012767487B2

(12) United States Patent
Kashiwakura

(10) Patent No.: US 12,767,487 B2
(45) Date of Patent: Oct. 20, 2026

(54) CAR DOOR DEVICE FOR AN ELEVATOR, AND AN ELEVATOR

(71) Applicant: FUJITEC CO., LTD., Shiga (JP)

(72) Inventor: Hiroshi Kashiwakura, Mason, OH (US)

(73) Assignee: FUJITEC CO., LTD., Shiga (JP)

( * ) Notice: Subject to any disclaimer, the term of this patent is extended or adjusted under 35 U.S.C. 154(b) by 38 days.

(21) Appl. No.: 18/942,773

(22) Filed: Nov. 11, 2024

(65) Prior Publication Data

US 2025/0187878 A1 Jun. 12, 2025

(30) Foreign Application Priority Data

Dec. 8, 2023 (JP) ................................ 2023-208055

(51) Int. Cl.
*B66B 13/12* (2006.01)
*B66B 13/08* (2006.01)

(52) U.S. Cl.
CPC .............. *B66B 13/12* (2013.01); *B66B 13/08* (2013.01)

(58) Field of Classification Search
CPC ................................ B66B 13/12; B66B 13/02
See application file for complete search history.

(56) References Cited

U.S. PATENT DOCUMENTS

| | | | |
|---|---|---|---|
| 5,005,673 A | 4/1991 | Rivera | |
| 7,077,242 B2 * | 7/2006 | Cocher | B66B 13/24 187/333 |
| 2021/0276830 A1 * | 9/2021 | Kashiwakura | B66B 13/12 |

FOREIGN PATENT DOCUMENTS

| | | | | |
|---|---|---|---|---|
| EP | 1266860 A1 * | 12/2002 | | B66B 13/12 |
| JP | H09-164655 A | 6/1997 | | |
| JP | 2020-059598 A | 4/2020 | | |
| JP | 6694608 B1 | 5/2020 | | |
| JP | 6751534 B1 | 9/2020 | | |
| JP | 2021-169347 A | 10/2021 | | |
| WO | 01046058 A1 | 6/2001 | | |
| WO | 2010125650 A1 | 11/2010 | | |
| WO | WO-2015008386 A1 * | 1/2015 | | B66B 13/12 |
| WO | 2020179911 A1 | 9/2020 | | |

* cited by examiner

*Primary Examiner* — Diem M Tran
(74) *Attorney, Agent, or Firm* — HAUPTMAN HAM, LLP

(57) ABSTRACT

The object of the present invention is to provide a highly versatile connection bar of an engaging body which can be installed in various locations in a car door device for an elevator, and an elevator. A connection bar includes a bar main body; and, a bar material is used as the bar main body, where the bar material includes, in at least one location in the longitudinal direction, a thin part formed along a direction crossing the longitudinal direction, so that a portion of the bar material can be broken off. If necessary, an unnecessary part of the bar material can be broken off at the thin part, so that the length of the bar main body can be changed. Since the break-off work can be carried out on-site, the length of the bar main body can be adjusted on-site.

19 Claims, 12 Drawing Sheets

3, 30

3, 30

CAR DOOR DEVICE FOR AN ELEVATOR, AND AN ELEVATOR

CROSS-REFERENCE TO RELATED APPLICATIONS

This application claims priority to Japanese Patent Application No. 2023-208055 filed Dec. 8, 2023, the disclosure of which is hereby incorporated by reference in its entirety.

BACKGROUND OF THE INVENTION

Field of the Invention

The present invention relates to a car door device for an elevator in which an engaging body engaging with an engaged body of a landing door is provided at a car door, and an elevator.

Description of the Related Art

As this kind of a car door device for an elevator, a device described in JP 2021-169347 A (Patent Literature 1) is known. Engaging bodies (an operation-board part 30 and a grip plate part 50 in Patent Literature 1) are provided as one pair, where the pair of engaging bodies is arranged in parallel on an outer surface side of a car door, so that the engaging bodies have predetermined intervals on the left and right sides, and each of the engaging bodies is provided movably between a first state and a second state.

The pair of engaging bodies is a component of a landing door engagement device. The first engaging body (the engaging body near an inner edge of the car door, i.e., the operation-board part 30) engages with the engaged body of the landing door when the car door operates to open. When the car door operates to open, the second engaging body (grip plate part 50) changes from the first state to the second state, engages with the engaged body, and clamps the engaged body together with the first engaging body. In this manner, the landing door operates to open without causing lateral vibrations as the car door operates to open.

The first engaging body is also a component of a door lock device of the car door. When engaging with the engaged body, the first engaging body receives a reaction force from the engaged body to change from the first state to the second state, and changes the locking body of the door lock device from the locked state to the unlocked state. In this manner, the car door is unlocked and can operate to open.

When the first engaging body engages with the engaged body, the engaged body changes from the first state to the second state and changes the locking body of the door lock device of the landing door from the locked state to the unlocked state. In this manner, the landing door is unlocked and can operate to open.

By the way, each of the pair of engaging bodies is connected via a connection bar to another mechanical element of a device such as a locking body. This is based on the following reason. Namely, when newly constructing a landing door engagement device and door lock device to an existing elevator (modernization of an elevator), for the sake of convenience for installation space, one pair of engaging bodies needs to be installed downward in a separated location.

However, a location for installing the pair of engaging bodies differs at every site for the modernization. It has been conventionally necessary to specify the length of the connection bar as well as to design and fabricate the connection bar for each site. Moreover, it is difficult to correctly specify the length of the connection bar by site investigation, and even if the connection bar is designed and fabricated, the length actually required on a site is different, and hence the connection bar needed to be designed and fabricated again each time.

SUMMARY OF THE INVENTION

Therefore, the present invention is made in consideration of the above circumstance and its object is to provide a highly versatile connection bar of an engaging body which can be installed in various locations in a car door device for an elevator, and an elevator.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The car door device for an elevator, comprises: a car door moving laterally to open and close an opening of the car; an engaging body engaging with an engaged body of a landing door when the car door moves, the engaging body being movably provided between a first state and second state; and a connection bar for operatively connecting the engaging body with another mechanical element, wherein the connection bar includes a bar main body; and a bar material is used as the bar main body, where the bar material is provided, in at least one location in a longitudinal direction, with a thin part formed along a direction crossing the longitudinal direction, so that a portion of the bar material can be broken off.

The aforementioned car door device for an elevator can be configured such that a thin part is formed at several locations in the longitudinal direction of the bar material.

The aforementioned car door device for an elevator can be configured such that a thin part is formed at equal intervals in several locations in the longitudinal direction of the bar material.

The aforementioned car door device for an elevator can be configured such that a thin part has a depth of 50±10% of a thickness of the bar material.

The aforementioned car door device for an elevator can be configured such that a thin part is formed over the entire width of the bar material.

The aforementioned car door device for an elevator can be configured such that a thin part is a recess.

The aforementioned car door device for an elevator can be configured such that a thin part is a recess having a V-shaped section.

The aforementioned car door device for an elevator can be configured such that a bar material has an elongated hole formed along the longitudinal direction of the bar material, and a thin part is formed in an elongated hole formation region in the longitudinal direction of the bar material.

The aforementioned car door device for an elevator can be configured such that an elongated hole has a length equal to or larger than 50% of a length of the bar material.

The aforementioned car door device for an elevator can be configured such that an elongated hole has a length equal to or smaller than 90% of a length of the bar material.

The aforementioned car door device for an elevator can be configured such that an elongated hole is formed near one end of the bar material, and a predetermined region in the longitudinal direction of the bar material including the other end of the bar material is an elongated hole non-formation region.

The aforementioned car door device for an elevator can be configured such that an elongated hole has a width of 25% to 60% of a width of the bar material.

The aforementioned car door device for an elevator can be configured such that an elongated hole is formed so that a center line in the width direction of the elongated hole accords with a center line in the width direction of the bar material.

The aforementioned car door device for an elevator can be configured such that one end of the bar main body is an open end where an elongated hole reaches an edge of the bar main body.

The aforementioned car door device for an elevator can be configured such that one end of the bar main body is a closed end where an elongated hole does not reach an edge of the bar main body.

The aforementioned car door device for an elevator can be configured such that the connection bar includes a reinforcing bar joined to the bar main body so that the reinforcing bar is made to support and abut against a thin part formation region in the longitudinal direction of the bar main body.

The aforementioned car door device for an elevator can be configured such that the bar main body and the reinforcing bar are plate-type members, a thin part is formed on one surface of the bar main body, and the reinforcing bar is made to support and abut against the reverse surface of the bar main body.

The aforementioned car door device for an elevator can be configured such that a thin part is formed at equal intervals in several locations in the longitudinal direction of the bar main body, the reinforcing bar includes fastening points at equal intervals in several locations in the longitudinal direction of the reinforcing bar, a pitch of the fastening points in the longitudinal direction of the reinforcing bar accords with a pitch of the thin part in the longitudinal direction of the bar main body, and the bar main body and the reinforcing bar are joined by at least two fasteners.

The aforementioned car door device for an elevator can be configured such that the bar main body and the reinforcing bar are plate-type members, a thin part is formed on one surface of the bar main body and also formed at equal intervals in several locations in the longitudinal direction of the bar main body, the reinforcing bar includes fastening points at equal intervals in several locations in the longitudinal direction of the reinforcing bar, a pitch of the fastening points in the longitudinal direction of the reinforcing bar accords with a pitch of the thin part in the longitudinal direction of the bar main body, the reinforcing bar is made to support and abut against the reverse surface of the bar main body, and the bar main body and the reinforcing bar are joined by at least two fasteners.

The aforementioned car door device for an elevator can be configured such that when the engaging body moves, a compression load acts on the connection bar.

The aforementioned car door device for an elevator can be configured such that the reinforcing bar has a width equal to a width of the bar main body.

The aforementioned car door device for an elevator can be configured such that the reinforcing bar is made to support and abut against the bar main body so that both edges in the width direction of the reinforcing bar accord with both edges in the width direction of the bar main body.

The elevator comprises the aforementioned car door device.

BRIEF DESCRIPTION OF THE DRAWINGS

The aforementioned features and the other features of the present invention will be clarified by the following description and figures illustrating the embodiments of the present invention.

DETAILED DESCRIPTION OF THE INVENTION

Hereinafter, one embodiment of an elevator provided with a landing door engagement device and a door lock device of a car door according to the present invention will be explained. Hereinafter, the expressions "first", "second", and "third" are used in order to represent that the matters with these expressions are mutually different and the numbers themselves have no particular meaning.

Figure 1:
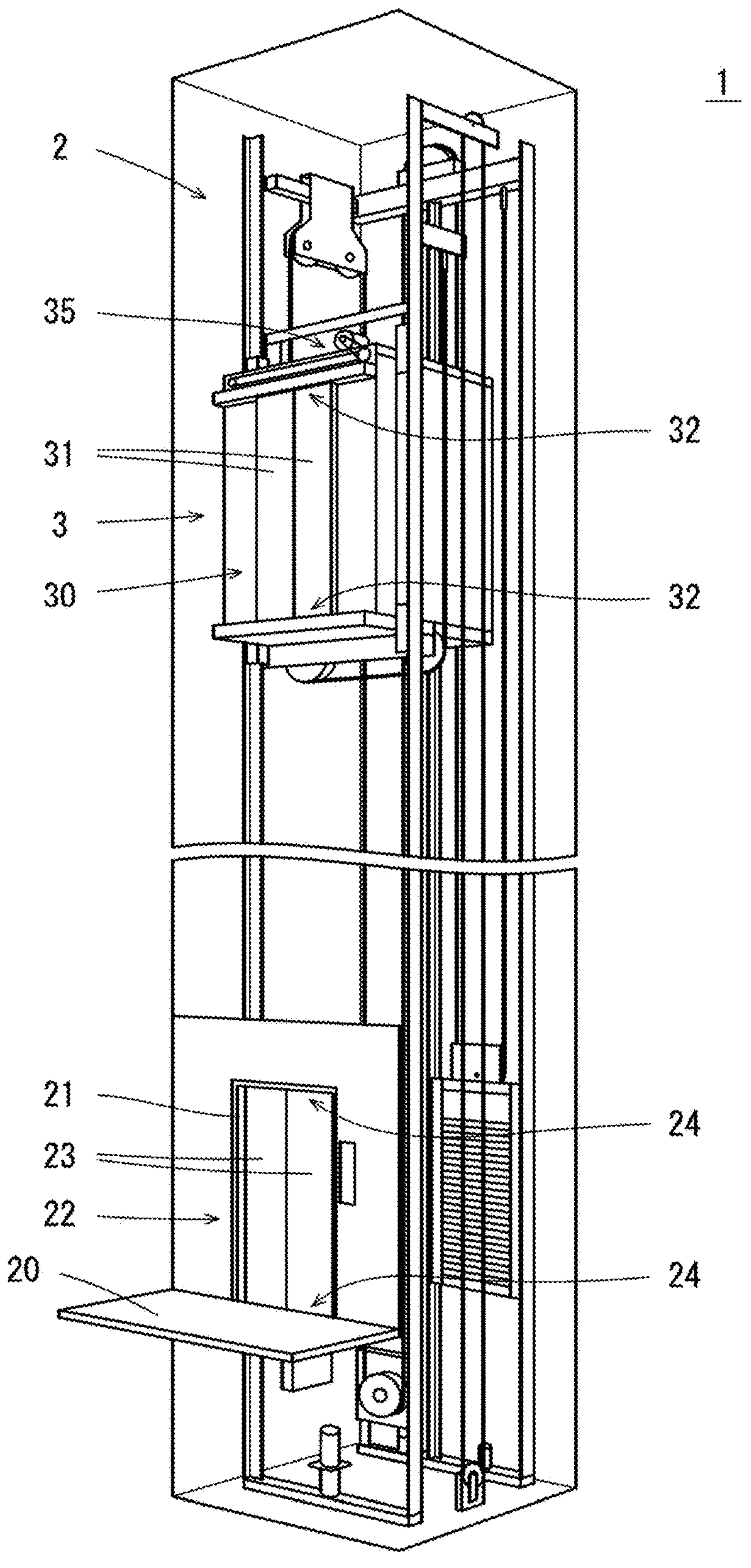
FIG. 1 is a perspective view showing an elevator.

As shown in FIG. 1, an elevator 1 includes a hoistway 2 and a car 3. The hoistway 2 extends vertically inside a building having several stories. The car 3 is driven by a drive mechanism to move up and down in the hoistway 2, and the driving is stopped by the drive mechanism to stop on a designated floor.

The car 3 includes a car door device 30. The car door device 30 includes a car door 31, a door support structure 32, and a door opening/closing device 35. The car door 31 moves in left and right directions (left and right horizontal directions; hereinafter the same applies) to open and close a front opening (car entrance) of the car 3, so that passengers can get in and out. The door support structure 32 is a structural body which enables the car door 31 to operate to open and close, while supporting the car door 31. The door opening/closing device 35 is a device which causes the car door 31 to operate to open and close.

On the other hand, a landing 20 for each floor includes a three-way frame 21 and a landing door device 22. The three-way frame 21 is formed on the wall surface and has an opening whose size within the frame corresponds to the opening of the car 3. The landing door device 22 includes a landing door 23 and a door support structure 24. The landing door 23 moves in left and right directions to open and close the opening (landing entrance) within the three-way frame 21, so that the passengers can get in and out. An elastic force is applied to the landing door 23, so that it is normally closed. The landing door 23 is opened against the elastic energization, driven by the operation to open the car door 31 of the car 3 having stopped at a floor, and is closed by the elastic energization as the car door 31 operates to close. The door support structure 24 is a structural body which enables the landing door 23 to operate to open and close, while supporting the landing door 23.

Figure 2A:
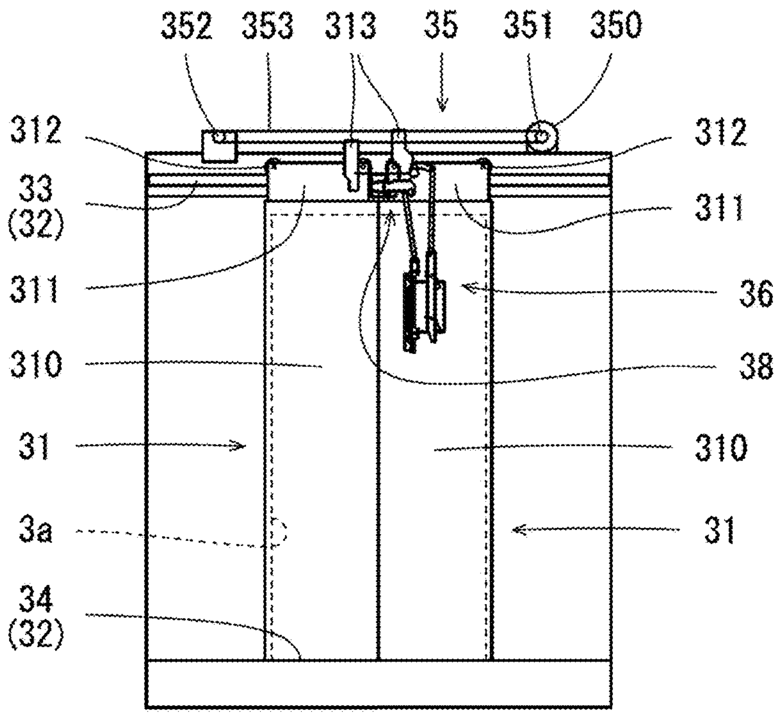
FIG. 2A is a front view showing a car having its car door fully closed, which is seen from a landing side.
Figure 2B:
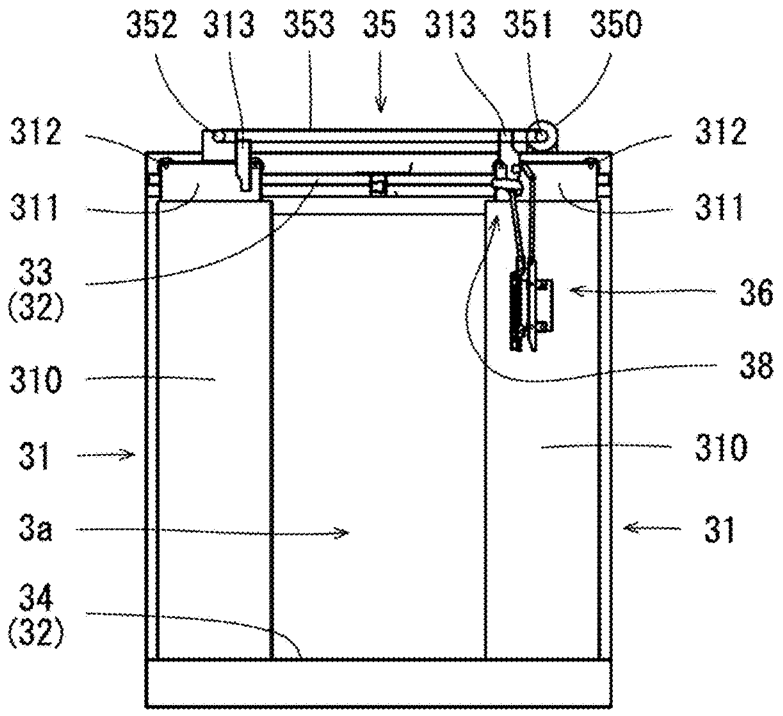
FIG. 2B is a front view showing a car having its car door fully opened.

As shown in FIGS. 2A and 2B, the car door 31 includes a door panel 310, a door hanger 311, and a connection body 313. The door panel 310 is arranged along a vertical surface and is a subject as the door of the car door 31 for opening and closing an opening 3*a* of the car 3. The door hanger 311 is integrally attached to an upper end of the door panel 310. The door hanger 311 includes a pair of rollers 312, 312. A pair of rollers 312, 312 are arranged at the upper end of the door hanger 311 at intervals in left and right directions. The connection body 313 is attached at the upper end of the door hanger 311 and between the pair of rollers 312, 312. The connection body 313 is an appliance for connecting (the door hanger 311 of) the car door 31 to a below-described drive belt 353 of the door opening/closing device 35.

The door support structure 32 includes a door rail 33 and a sill 34. The door rail 33 is a straight and long plate-type member and is provided in an upper part of the front face of the car 3 in left and right directions. The rollers 312, 312 of the door hanger 311 are mounted on an upper edge part of the door rail 33, so that the car door 31 is suspended from the door rail 33 in a state of being slidable along the door rail 33 in left and right directions. The door rail 33 is a structural body which enables the car door 31 to operate to open and close, while supporting an upper part of the car door 31. On the other hand, the sill 34 is provided in a lower part of the front face of the car 3 in left and right directions, so that the sill 34 follows along a lower edge of the opening 3*a* and has its both ends widening more in left and right directions than the lower edge. The sill 34 is a structural body which enables the car door 31 to operate to open and close, while supporting the lower part of the car door 31.

The door opening/closing device 35 includes a drive motor 350, a drive pulley 351, a driven pulley 352, and a drive belt 353. The drive motor 350 is provided on one of left and right end sides on the upper part of the front face of the car 3. The drive pulley 351 is provided coaxially and integrally with respect to a drive shaft of the drive motor 350. The driven pulley 352 is provided on the other one of the left or right end sides on the upper part of the front face of the car 3. The drive belt 353 is an endless belt wound between the drive pulley 351 and the driven pulley 352. The drive belt 353 is provided in left and right directions and provided parallel to the door rail 33.

When the drive motor 350 is driven, the drive pulley 351 rotates and, at the same time, the drive belt 353 moves in a circulating manner. In this manner, the two left and right car doors 31, 31 reciprocate along the door rail 33 and operate to open and close. The one car door 31 is connected to one side of the drive belt 353 via the connection body 313, while the other car door 31 is connected to the other side of the drive belt 353 via the connection body 313. In this manner, a pair of car doors 31, 31 move in directions opposite to each other. Namely, the car door device 30 and the landing door device 22 are of a center open type in which the opening 3*a* of the car 3 opens from the center.

The car door device 30 includes a landing door engagement device 36 and a door lock device 38. When the car door 31 operates to open (and close), the landing door engagement device 36 engages with the engaged body of the landing door 23, thereby causing the landing door 23 to operate to open (and close) as the car door 31 operates to open (and close). The door lock device 38 is a device which restricts the operation to open the car door 31 in a fully closed state. The details of the landing door engagement device 36 and the car door lock device 38 will be described below.

Figure 3A:
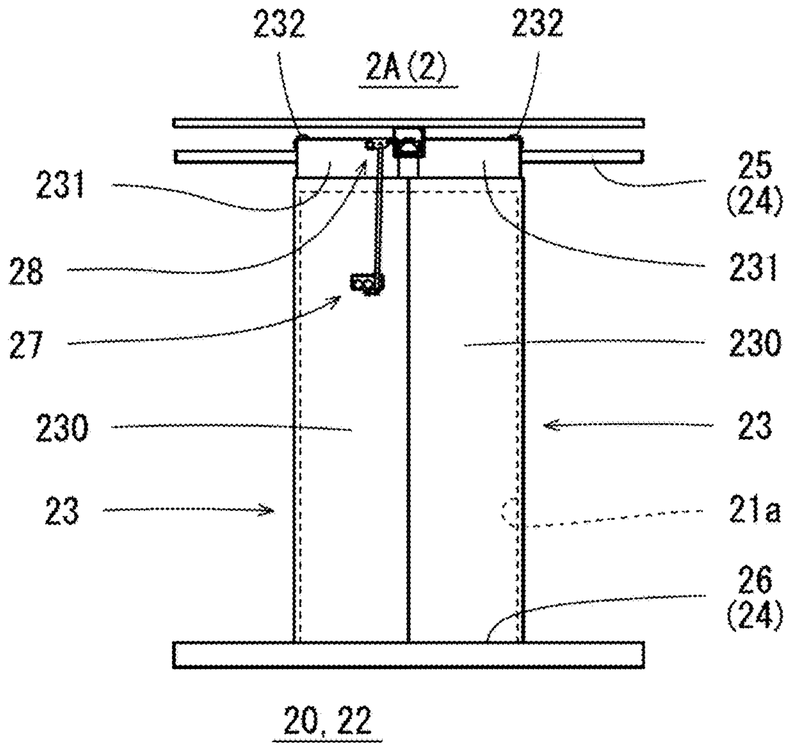
FIG. 3A is a front view showing a landing entrance having its landing door fully closed, which is seen from the inside of a hoistway.
Figure 3B:
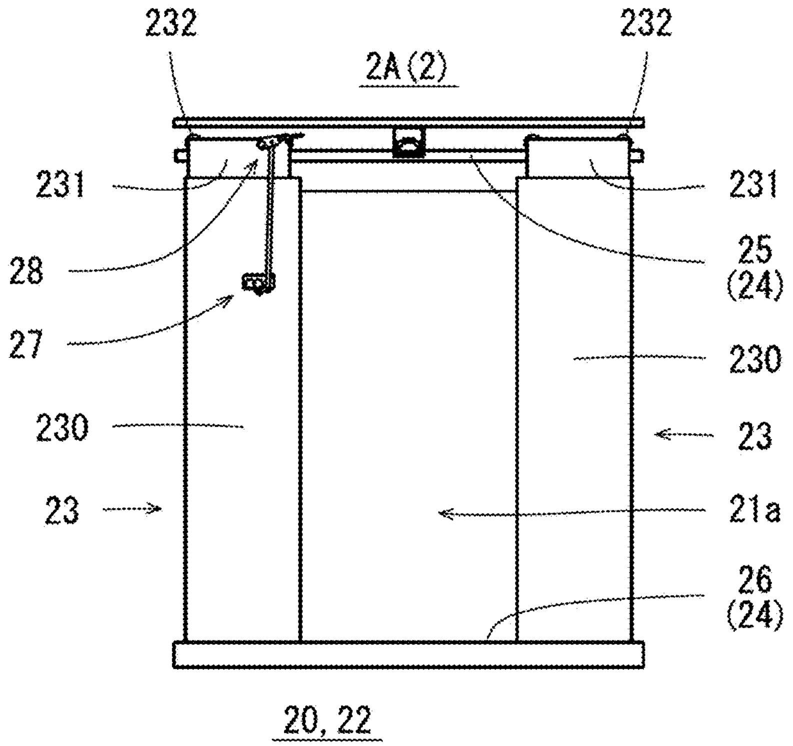
FIG. 3B is a front view showing a landing entrance having its landing door fully opened.

As shown in FIGS. 3A and 3B, the landing door 23 and the door support structure 24 also have the same structures as the car door 31 and the door support structure 32. Therefore, the descriptions of the landing door 23 and the door support structure 24 will be omitted because they are identical to the above descriptions of the car door 31 and the door support structure 32.

The landing door device 22 includes the above-described engaged body 27 and a door lock device 28. As described above, the engaged body 27 is a portion with which the landing door engagement device 36 of the car door device 30 engages. The door lock device 28 is a device which restricts the operation to open the landing door 23 in a fully closed state.

Figure 4A:
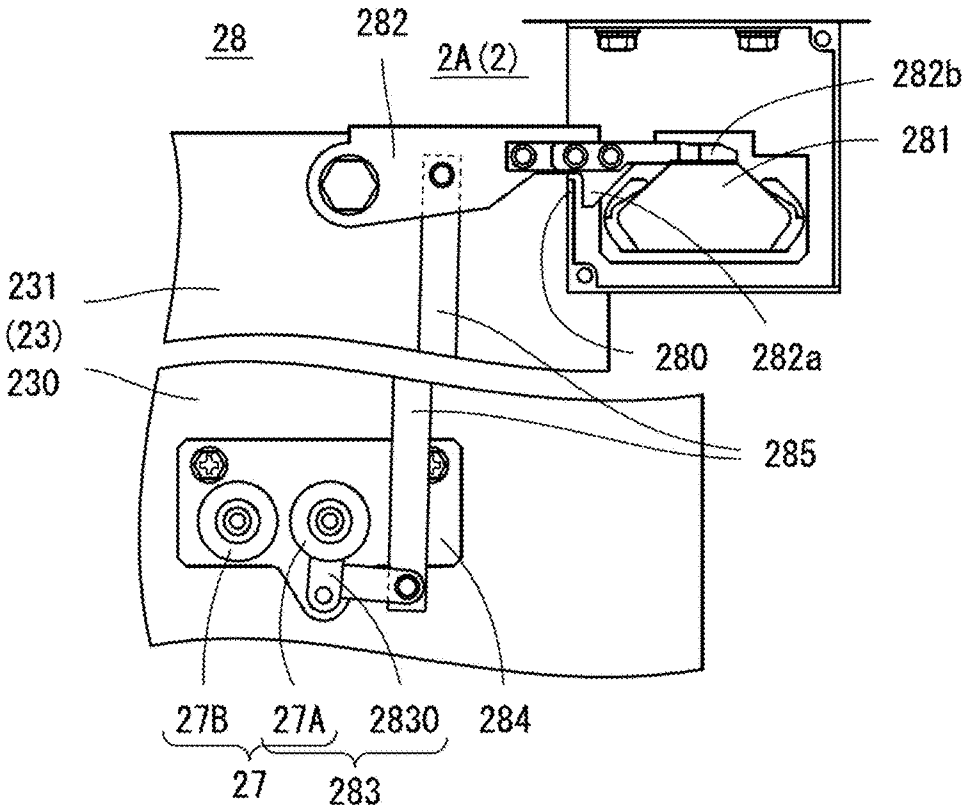
FIG. 4A is a front view showing a door lock device of a landing door in a locked state, which is seen from the inside of the hoistway.
Figure 4B:
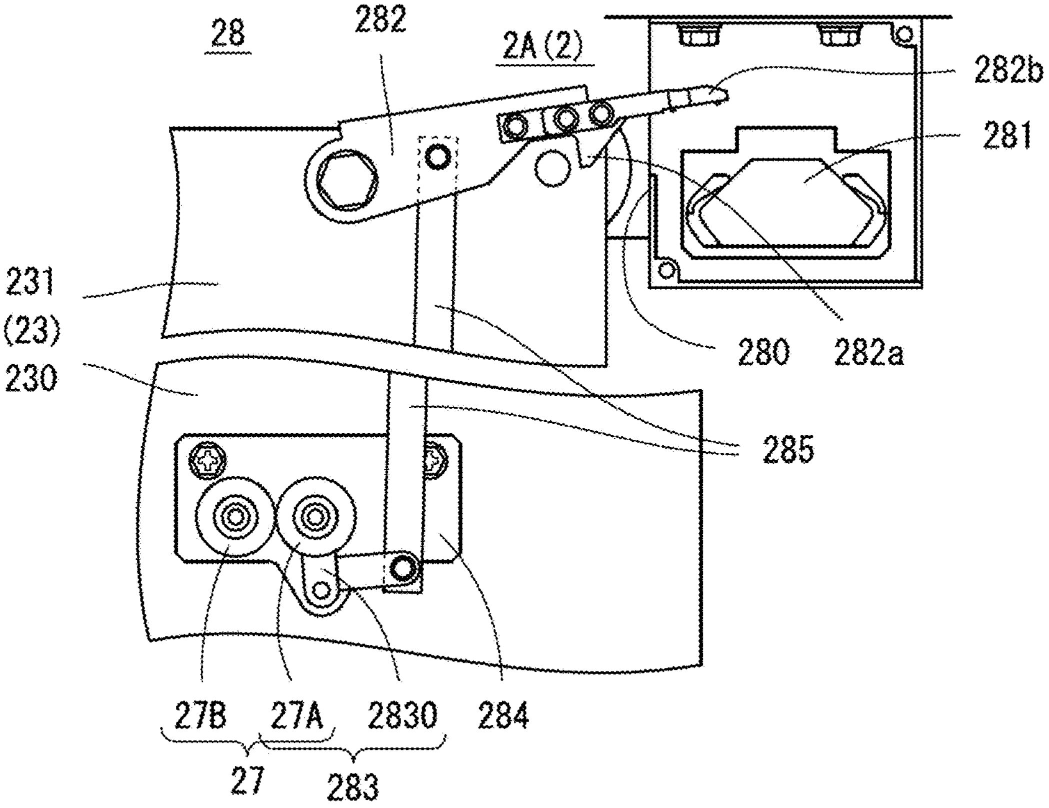
FIG. 4B is a front view showing the door lock device of the landing door in an unlocked state.

As shown in FIGS. 4A and 4B, the engaged body 27 consists of rollers 27A and 27B. The roller 27A is provided in the below-described swinging arm 2830 as a first roller and a movable roller. The roller 27B is provided near the roller 27A at a location which is not the swinging arm 2830 as a second roller and a fixed roller. The rollers 27A and 27B are provided rotatably around a direction as an axis orthogonal to a vertical surface of the landing door 23.

The door lock device 28 includes a locked body 280 and a switch 281 in a door closing detection part as configurations on a landing entrance side, while including a locking body 282, an operation body 283, and a connection bar 285 as configurations on the side of a landing door 23.

The locked body 280 and the switch 281 are attached to an inner wall surface 2A of the hoistway 2 around the landing entrance directly or indirectly via an attachment plate, a bracket, and a frame, etc. The locked body 280 and the switch 281 are provided in an upper region of an inner side edge (of the left and right side edges of the landing door 23, a side edge on the side where the landing entrance is closed) of the landing door 23 in a fully closed state. The locked body 280 is a plate-type member following along the direction crossing the opening/closing direction of the landing door 23. The switch 281 takes a form of an interlock switch constituting a part of a safety circuit of a driving device of the elevator 1.

The locking body 282 is attached to (the outer surface of) the door hanger 231 directly or indirectly via the attachment plate, etc. The locking body 282 is swingably provided at a first part (as one example, a base part) of the locking body 282. The locking body 282 is provided rotatably between the first state (FIG. 4A) in which a height position of a second part (as one example, the tip) of the locking body 282 lowers to reduce tilting (as one example, becomes horizontal) and the second state (FIG. 4B) in which the height position of the second part of the locking body 282 rises to increase the tilting. The locking body 282 is provided rotatably around the direction as an axis orthogonal to a vertical surface of the landing door 23.

The locking body 282 includes a locking part 282*a*. The locking part 282*a* is a claw-like part which protrudes downward from the main body of the locking body 282. In the first state of the locking body 282, the locking part 282*a* is at the same height as the locked body 280 and can engage with the locked body 280 in a direction of opening of the landing door 23, thereby restricting an operation to open (locked state) the landing door 23 in a fully closed state. On the other hand, in the second state of the locking body 282, the locking part 282*a* is located higher than the locked body 280 and cannot engage with the locked body 280 in the direction of opening of the landing door 23, thereby allowing an operation to open (unlocked state) the landing door 23 in the fully closed state.

The locking body 282 includes a conductor part 282*b*. The conductor part 282*b* is attached to the second part of the locking body 282. When the locking body 282 is in a locked state, the conductor part 282*b* acts in contact with a (non-illustrated) pair of terminals of the switch 281 to turn on (or off) the switch 281. A control part of the elevator 1 determines that the locking body 282 is in a locked state based on an ON signal (or OFF signal) of the switch 281. Then, as a result, the control part of the elevator 1 determines that the landing door 23 is in the fully closed state. On the other hand, when the locking body 282 is in the unlocked state, the conductor part 282*b* is separated from the pair of terminals of the switch 281 to turn off (or on) the switch 281. The control part of the elevator 1 determines that the locking body 282 is in the unlocked state based on an OFF signal (or ON signal) of the switch 281. Then, as a result, the control part of the elevator 1 determines that the landing door 23 is not in the fully closed state.

The operation body 283 is arranged at a position of the landing door 23 lower than the locking body 282 to carry out an operation to switch the locking body 282 between the locked state and the unlocked state via the connection bar 285. The operation body 283 is attached to (the outer surface of) the door panel 230 directly or indirectly via the attachment plate 284, etc.

The operation body 283 includes the above-described roller 27A and the swinging arm 2830. The swinging arm 2830 is swingably provided at the first part (as one example, the base part) of the swinging arm 2830. The swinging arm 2830 is provided rotatably between the first state (FIG. 4A) corresponding to the first state (locked state) of the locking body 282 and the second state (FIG. 4B) corresponding to the second state (unlocked state) of the locking body 282. The roller 27A is provided at the second part (as one example, the tip) of the swinging arm 2830. The roller 27A and the swinging arm 2830 are provided rotatably around the direction as the axis orthogonal to the vertical surface of the landing door 23.

The connection bar 285 connects the locking body 282 to the operation body 283. The connection bar 285 is a straight and long plate-type member. The locking body 282 is arranged above and the operation body 283 is arranged below the connection bar 285, so that the connection bar 285 is arranged along upper and lower directions (a concept including a direction tilting with respect to a vertical direction to some extent) between the locking body 282 and the operation body 283. The connection bar 285 is rotatably connected to the third part (as one example, an intermediate part) of the locking body 282 at the first part (as one example, one end (upper end)) of the connection bar 285 and rotatably connected to the third part (as one example, a tip of a protruding piece protruding laterally from the intermediate part) of the swinging arm 2830 at the second part (as one example, the other end (lower end)) of the connection bar 285. In this manner, the connection bar 285 constitutes a link between the locking body 282 and the operation body 283.

Figure 5:
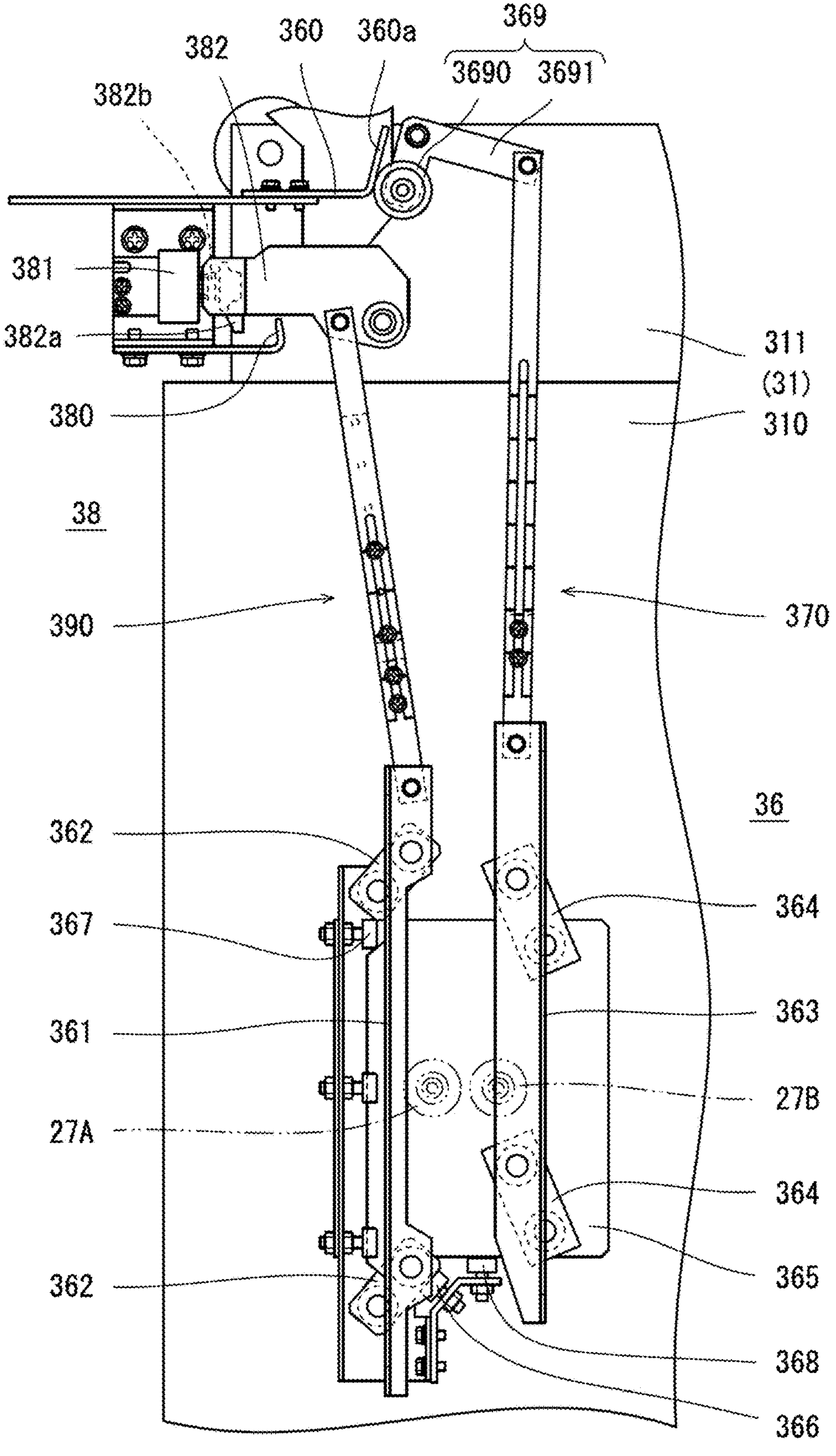
FIG. 5 is a front view showing the landing door engagement device in a non-operating state due to the car door being fully closed and the door lock device of the car door in a locked state, which are seen from the landing side.
Figure 6:
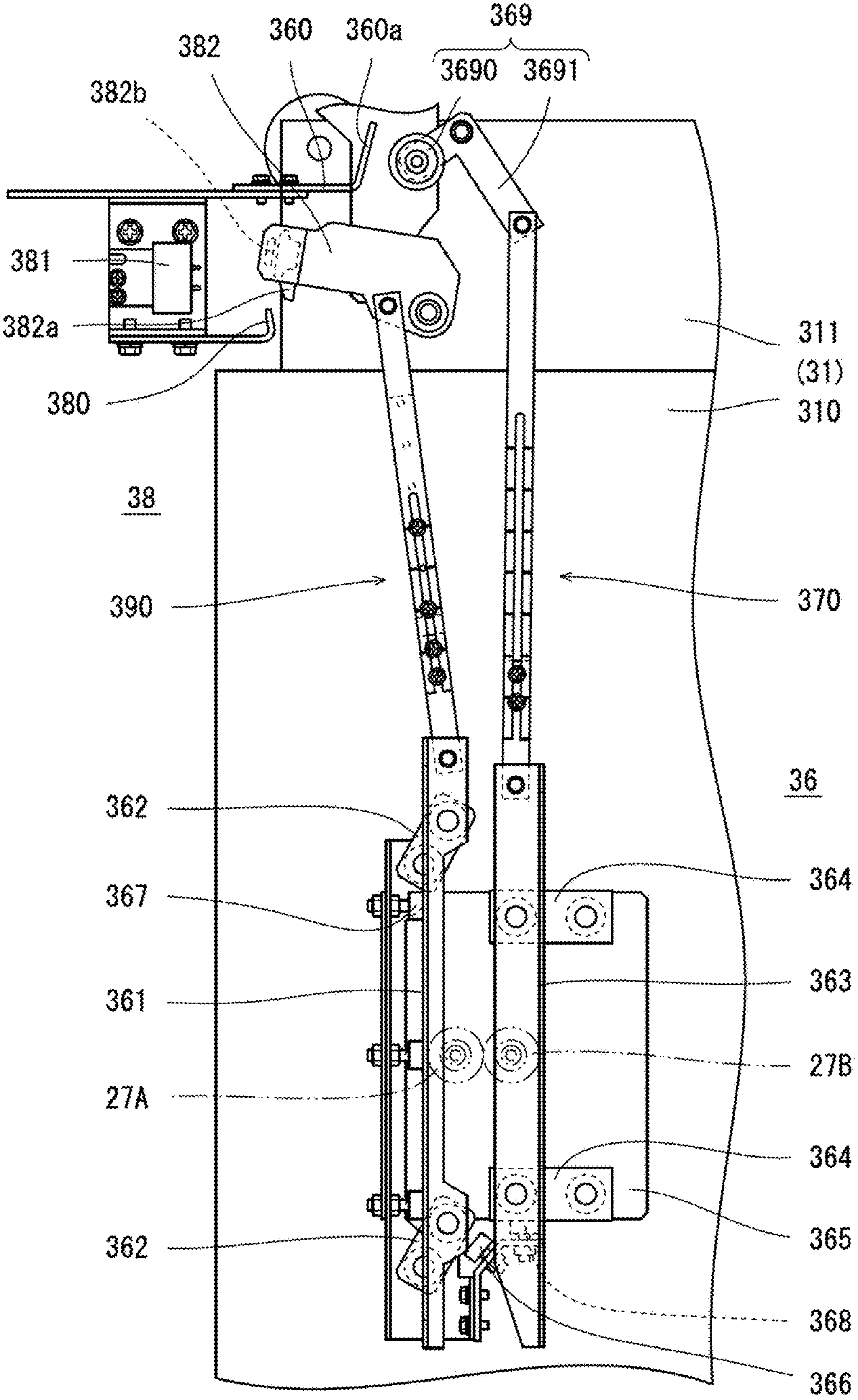
FIG. 6 is a front view showing the landing door engagement device in an operating state due to the car door starting an operation to open, and the door lock device of the car door in an unlocked state, which are seen from the landing side.

As shown in FIGS. 5 and 6, the landing door engagement device 36 includes a contact body 360 as a configuration on the car entrance side and includes a first cam 361 and a second cam 363, an operation body 369, and a connection bar 370 as a configuration on the side of the car door 31.

The contact body 360 is attached to the front face of the car 3 around the car entrance directly or indirectly via the attachment plate, the bracket, and the frame, etc. The contact body 360 is provided in the upper region of the inner side edge (of the left and right side edges of the car door 31, the side edge on the side where the car entrance is closed) of the car door 31 in the fully closed state. The contact body 360 is a member having a cam part 360*a* tilting with respect to the opening/closing direction of the car door 31. The contact body 360 is a long and plate-type member with a bent tip side and the bend part becomes the cam part 360*a*.

The first cam 361 and the second cam 363 are one mode of the engaging body engaging with the engaged body 27 of the landing door device 22. The first cam 361 and the second cam 363 are attached to (the outer surface of) the door panel 310 directly or indirectly via the attachment plate 365, etc. The first cam 361 and the second cam 363 are members which are arranged by length along the up and down directions as well as in parallel at predetermined intervals in the left and right directions. The first cam 361 and the second cam 363 are angled materials having a long plate-type part along the vertical surface of the car door 31 and a long plate-type part (cam part) orthogonal to the vertical surface of the car door 31. The first cam 361 and the second cam 363 are members made from metal such as iron, steel, stainless steel, or aluminum as a material.

The first cam 361 is provided movably between the first state (see FIG. 5) and the second state (see FIG. 6) in which the first cam 361 gets closer to the inner edge of the car door 31 than in the first state. The second cam 363 is provided movably between the first state (see FIG. 5) and the second state (see FIG. 6) in which the second cam 363 gets closer to the inner edge of the car door 31 and the first cam 361 than in the first state, so that the interval (width) with respect to the first cam 361 is narrowed. For this reason, the first cam 361 and the second cam 363 are called movable cams.

The first cam 361 constitutes one link of a parallel crank mechanism or a parallel link mechanism and is provided to be capable of moving in parallel by a pair of parallel links 362, 362. The second cam 363 constitutes one link of a parallel crank mechanism or a parallel link mechanism and is provided to be capable of moving in parallel by a pair of parallel links 364, 364. Each joint of the mechanism is provided rotatably around a direction as an axis orthogonal to the vertical surface of the car door 31. In this manner, each of the first cam 361 and the second cam 363 is independently provided to be capable of moving in parallel along the vertical surface of the car door 31.

The first cam 361 swings between the first state (see FIG. 5) in which a pair of parallel links 362, 362 tilts obliquely and the second state (see FIG. 6) in which the tilting increases (slightly), so that the state of the mechanism changes to perform switching between the first state and the second state. The second cam 363 swings between the first state (see FIG. 5) in which a pair of parallel links 364, 364 tilts obliquely and the second state (see FIG. 6) in which the tilting decreases (as one example, becomes horizontal), so that the state of the mechanism changes to perform switching between the first state and the second state. The swinging angle is larger in the parallel link 364 than in the parallel link 362. Due to this, a stroke of the parallel movement is larger in the second cam 363 than in the first cam 361.

The first cam 361 is in the first state due to its own weight when the landing door engagement device 36 does not operate (when the car door 31 is fully closed) and changes from the first state to the second state, while moving obliquely upward, when the landing door engagement device 36 operates (when the car door 31 operates to open). The second cam 363 is in the first state when the landing door engagement device 36 does not operate and changes from the first state to the second state, while moving obliquely downward due to its own weight, when the landing door engagement device 36 operates.

The first state of the first cam 361 is defined by a stopper 366 and the second state of the first cam 361 is defined by a stopper 367. The second state of the second cam 363 is defined by a stopper 368. As for the respective stoppers 366 to 368, the positions can be adjusted (protrusion lengths can be adjusted), and the positions of the first cam 361 in the first state and the second state as well as the position of the second cam 363 in the second state can be adjusted.

The operation body 369 is arranged at a position of the car door 31 higher than the second cam 363 to carry out an operation to perform the switching between the first state and the second state of the second cam 363 via the connection bar 370. The operation body 369 is attached to (the outer surface of) the door hanger 311 directly or indirectly via the attachment plate, etc.

The operation body 369 includes a roller 3690 and a swinging arm 3691. The roller 3690 is separated from the cam part 360*a* of the contact body 360 while the car door 31 operates to open. On the other hand, the roller 3690 is in contact with the cam part 360*a* and moves on the cam part 360*a* while the car door 31 operates to close. The swinging arm 3691 is swingably provided at the first part (as one example, the intermediate part) of the swinging arm 3691. The swinging arm 3691 is provided rotatably between the first state (see FIG. 5) corresponding to the first state of the second cam 363 and the second state (see FIG. 6) corresponding to the second state of the second cam 363. The roller 3690 is provided at the second part (as one example, the one end) of the swinging arm 3691. The roller 3690 and the swinging arm 3691 are provided rotatably around the direction as the axis orthogonal to the vertical surface of the car door 31.

The connection bar 370 connects the second cam 363 to the operation body 369. The connection bar 370 is a straight and long plate-type member. The second cam 363 is arranged below and the operation body 369 is arranged above the connection bar 370, so that the connection bar 370 is arranged along the upper and lower directions (the concept including the direction tilting with respect to the vertical direction to some extent) between the second cam 363 and the operation body 369. The connection bar 370 is rotatably connected to the first part (as one example, the one part (upper end)) of the second cam 363 at the first part (as one example, the one end (lower end)) of the connection bar 370 and rotatably connected to the third part (as one example, the other end) of the swinging arm 3691 at the second part (as one example, the other end (upper end)) of the connection bar 370. In this manner, the connection bar 370 constitutes the link between the second cam 363 and the operation body 369.

The door lock device 38 includes a locked body 380 and a switch 381 in the door closing detection part as the configurations on the car entrance side, while including a locking body 382, the above-described first cam 361, and a connection bar 390 as the configurations on the side of the car door 31.

The locked body 380 and the switch 381 are attached to the front face of the car 3 around the car entrance directly or indirectly via the attachment plate, the bracket, and the frame, etc. The locked body 380 and the switch 381 are provided in the upper region of the inner side edge of the car door 31 in the fully closed state. The locked body 380 is a plate-type member following along the direction crossing the opening/closing direction of the car door 31. The switch 381 takes the form of the interlock switch constituting a part of the safety circuit of the driving device of the elevator 1.

The locking body 382 is attached to (the outer surface of) the door hanger 311 directly or indirectly via the attachment plate, etc. The locking body 382 is swingably provided at the first part (as one example, the base part) of the locking body 382. The locking body 382 is provided rotatably between the first state (see FIG. 5) in which the height position of the second part (as one example, the tip) of the locking body 382 lowers to reduce tilting (as one example, becomes horizontal) and the second state (see FIG. 6) in which the height position of the second part of the locking body 382 rises to increase the tilting. The locking body 382 is provided rotatably around the direction as the axis orthogonal to the vertical surface of the car door 31.

The locking body 382 includes a locking part 382*a*. The locking part 382*a* is a claw-like part which protrudes downward from the main body of the locking body 382. In the first state of the locking body 382, the locking part 382*a* is at the same height as the locked body 380 and can engage with the locked body 380 in the direction of opening of the car door 31, thereby restricting the operation to open (locked state) the car door 31 in the fully closed state. On the other hand, in the second state of the locking body 382, the locking part 382*a* is located higher than the locked body 380 and cannot engage with the locked body 380 in the direction of opening of the car door 31, thereby allowing the operation to open (unlocked state) the car door 31 in the fully closed state.

The locking body 382 includes a conductor part 382*b*. The conductor part 382*b* is attached to the second part of the locking body 382. When the locking body 382 is in the locked state, the conductor part 382*b* acts in contact with a pair of terminals of the switch 381 to turn on (or off) the switch 381. The control part of the elevator 1 determines that the locking body 382 is in the locked state based on an ON signal (or OFF signal) of the switch 381. Then, as a result, the control part of the elevator 1 determines that the car door 31 is in the fully closed state. On the other hand, when the locking body 382 is in the unlocked state, the conductor part 382*b* is separated from the pair of terminals of the switch 381 to turn off (or on) the switch 381. The control part of the elevator 1 determines that the locking body 382 is in the unlocked state based on an OFF signal (or ON signal) of the switch 381. Then, as a result, the control part of the elevator 1 determines that the car door 31 is not in the fully closed state.

The first cam 361 is one mode of the operation body. The first cam 361 is arranged at a position of the car door 31 lower than the locking body 382 to carry out an operation to switch the locking body 382 between the locked state and the unlocked state via the connection bar 390.

The connection bar 390 connects the locking body 382 to the first cam 361. The connection bar 390 is a straight and long plate-type member. The locking body 382 is arranged above and the first cam 361 is arranged below the connection bar 390, so that the connection bar 390 is arranged along the upper and lower directions (the concept including the direction tilting with respect to the vertical direction to some extent) between the locking body 382 and the first cam 361. The connection bar 390 is rotatably connected to the third part (as one example, the intermediate part) of the locking body 382 at the first part (as one example, one end (upper end)) of the connection bar 390 and rotatably connected to the first part (as one example, the one end (upper end)) of the first cam 361 at the second part (as one example, the other end (lower end)) of the connection bar 390. In this manner, the connection bar 390 constitutes the link between the locking body 382 and the first cam 361.

Figure 7C:
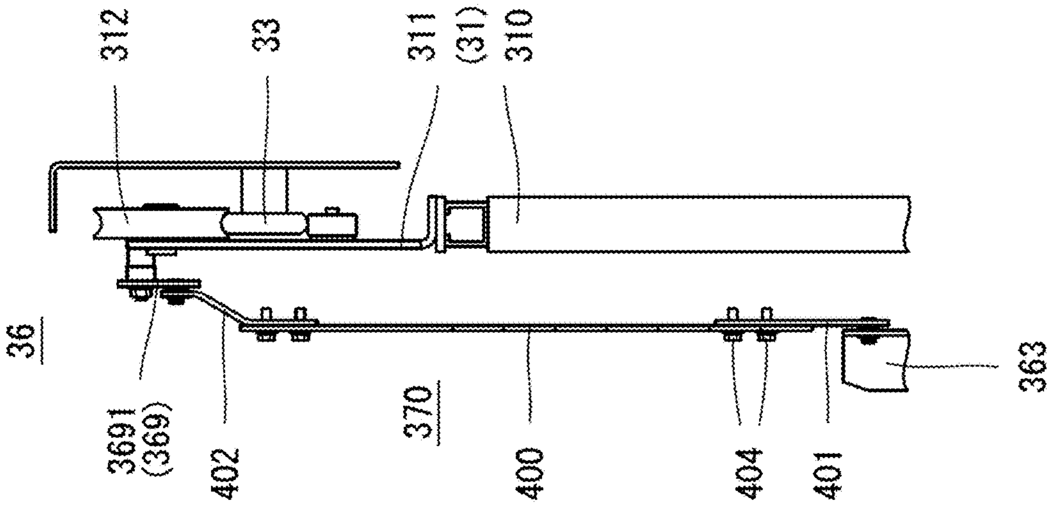
FIG. 7C is a side view showing the landing door engagement device and shows an Example 3 of the connection bar.
Figure 7B:
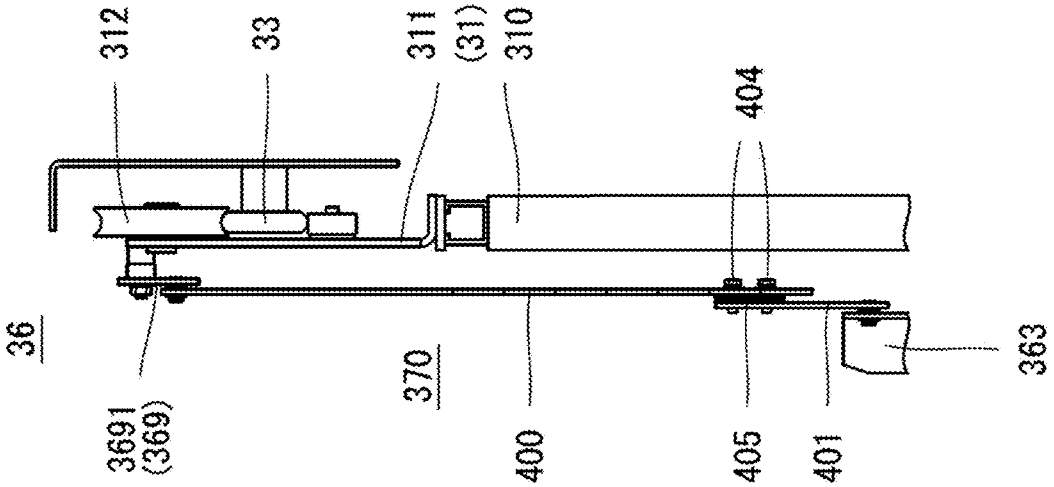
FIG. 7B is a side view showing the landing door engagement device and shows an Example 2 of the connection bar.
Figure 7A:
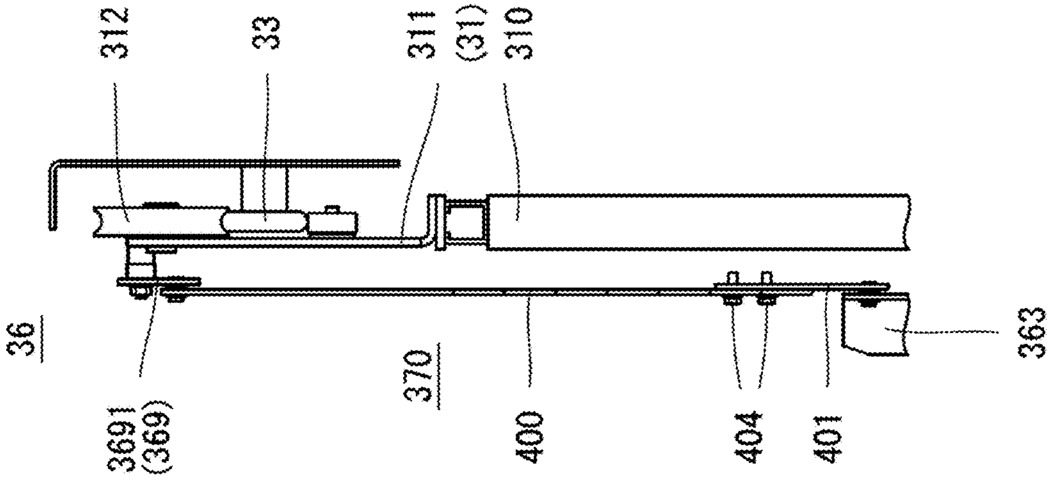
FIG. 7A is a side view showing the landing door engagement device and shows an Example 1 of the connection bar.
Figure 8C:
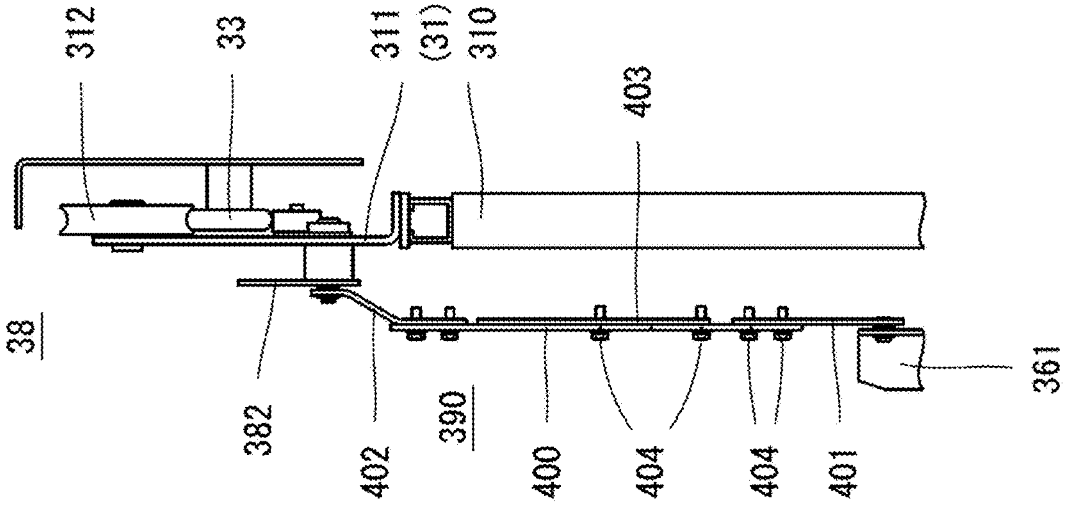
FIG. 8C is a side view showing the door lock device of the car door and shows the Example 3 of the connection bar.
Figure 8B:
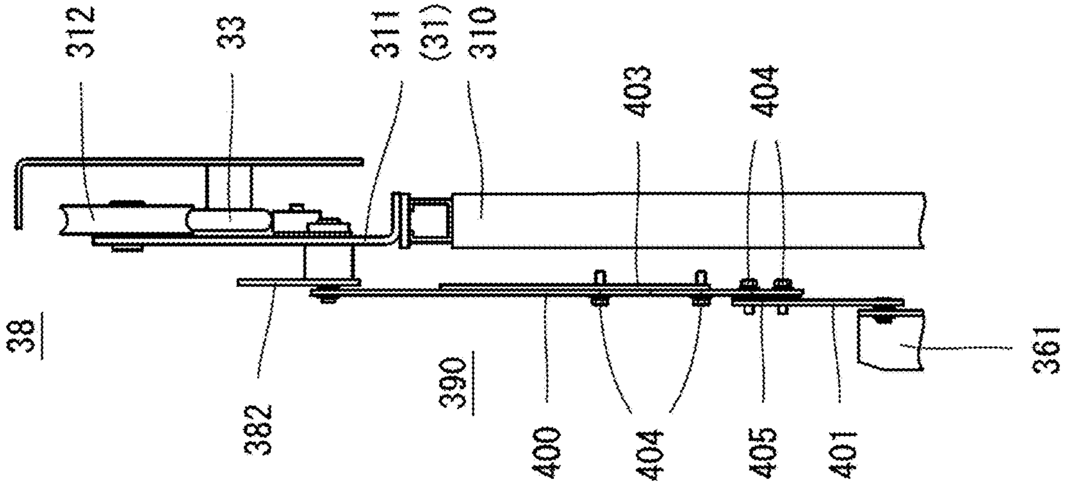
FIG. 8B is a side view showing the door lock device of the car door and shows the Example 2 of the connection bar.
Figure 8A:
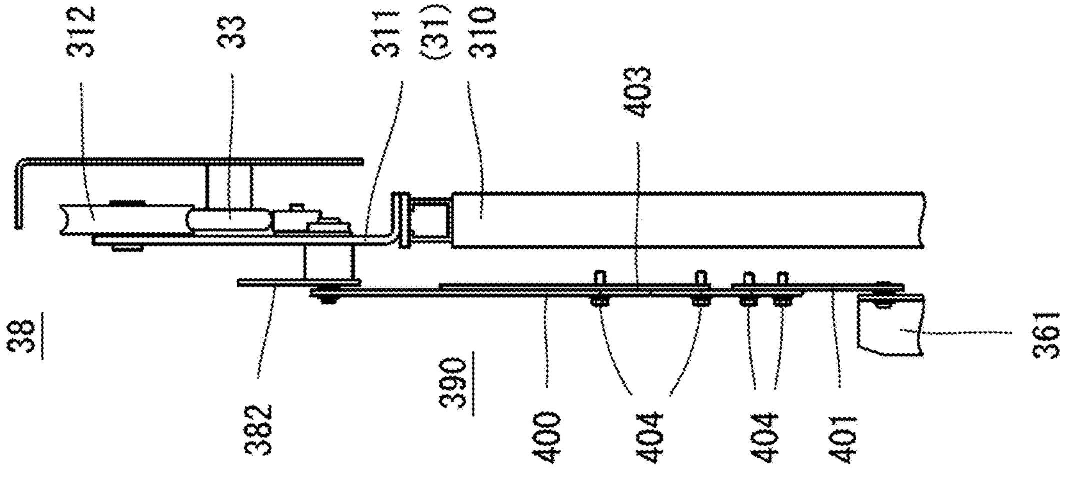
FIG. 8A is a side view showing the door lock device of the car door and shows the Example 1 of the connection bar.

As shown in FIGS. 7A to 7C and 8A to 8C, the connection bars 370, 390 are composed of a plurality of parts. Concretely, In Example 1 of the connection bar 370 shown in FIG. 7A, the connection bar 370 consists of a bar main body 400, an end bar 401, and an appropriate number of fasteners 404 (bolts and, if necessary, washers and spring washers; hereinafter the same applies);

In Example 2 of the connection bar 370 shown in FIG. 7B, the connection bar 370 consists of the bar main body 400, the end bar 401, the appropriate number of fasteners 404, and a plurality of shims 405;

In Example 3 of the connection bar 370 shown in FIG. 7C, the connection bar 370 consists of the bar main body 400, the end bars 401, 402, and the appropriate number of fasteners 404;

In Example 1 of the connection bar 390 shown in FIG. 8A, the connection bar 390 consists of the bar main body 400, the end bar 401, a reinforcing bar 403, and the appropriate number of fasteners 404;

In Example 2 of the connection bar 390 shown in FIG. 8B, the connection bar 390 consists of the bar main body 400, the end bar 401, the reinforcing bar 403, the appropriate number of fasteners 404, and the plurality of shims 405; and In Example 3 of the connection bar 390 shown in FIG. 8C, the connection bar 390 consists of the bar main body 400, the end bars 401, 402, the reinforcing bar 403, and the appropriate number of fasteners 404.

Figure 9A:
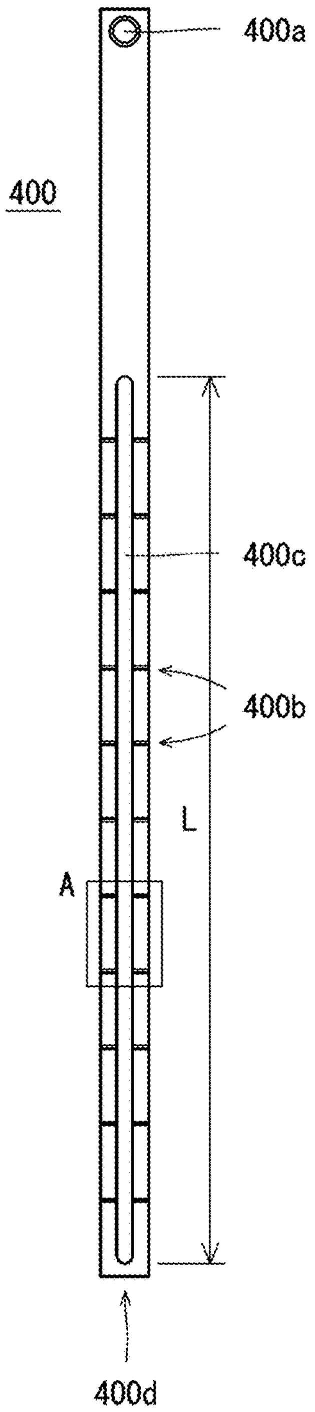
FIG. 9A is a front view showing a bar main body (bar material) of the connection bar.

As shown in FIGS. 9A to 9E, a bar material is used as the bar main body 400. As shown in FIG. 9A, the bar material is a straight long plate-type and flat bar (flat bar). The bar material includes one end (a lower end in the drawing) and the other end (an upper end in the drawing) in a longitudinal direction. The bar material has the length of about 200 mm to 800 mm (total length) (as one example, 500 mm). However, if the height positions of the first cam 361 and the second cam 363 are near the door hanger 311 of the car door 31 or near the center of the height direction of the car door 31, the length of the bar material needs to correspond to a reasonable length and may be about 100 mm or about 1500 mm. The bar material has the width of about 10 mm to 30 mm (total width) (as one example, 20 mm). The bar material has the thickness of about 1.5 mm to 5 mm (as one example, 3 mm). The bar material is a member made from metal such as iron, steel, stainless steel, or aluminum as a material. Alternatively, the bar material may be a member made from hard resin.

The other end includes a connection point 400*a* and is rotatably connected to another mechanical element. The connection point 400*a* is a bush fitted into a through hole formed at the other end. The bush has a pin as a rotary shaft inserted thereinto.

Figure 9B:
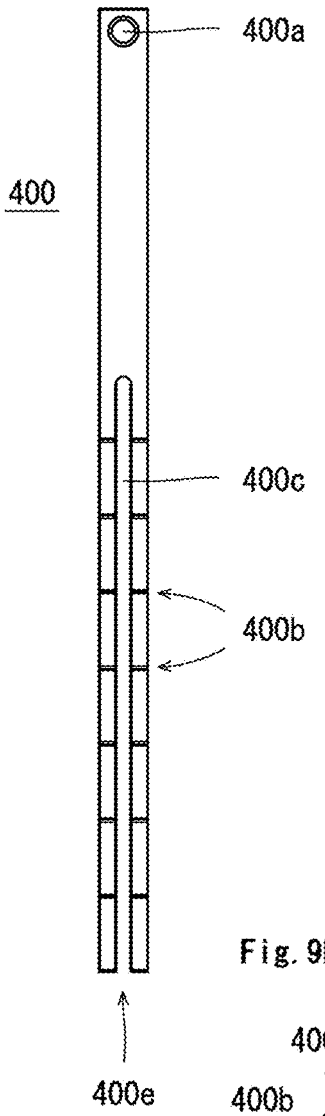
FIG. 9B is a front view showing the bar main body having had a predetermined length taken off therefrom for the connection bar of the landing door engagement device.
Figure 9C:
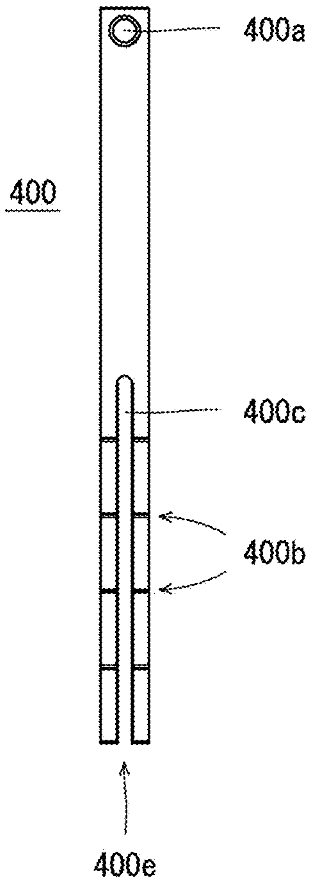
FIG. 9C is a front view showing the bar main body having had a predetermined length taken off therefrom for the connection bar of the door lock device of the car door.
Figure 9D:
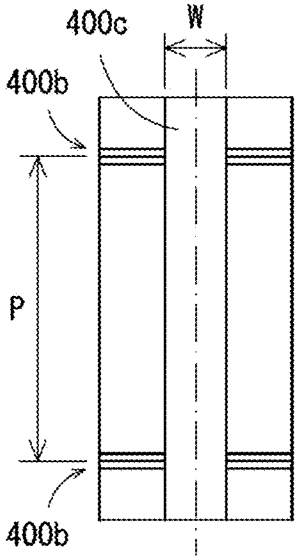
FIG. 9D is an enlarged view of the A portion of FIG. 9A.
Figure 9E:
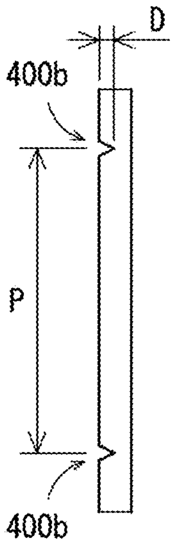
FIG. 9E is a side view of FIG. 9D.

The bar material (and the bar main body 400 using this material; hereinafter the same applies) includes a thin part 400*b*. The thin part 400*b* is formed along a direction (as one example, an orthogonal direction) crossing the longitudinal direction of the bar material. The thin part 400*b* is formed at least at one location in the longitudinal direction of the bar material. In this manner, as shown in FIGS. 9B and 9C, the bar material can have its part broken off at the location of the thin part 400*b*. Breaking off means breaking and fatigue-destroying the location to separate the part from the main body. This is also called fracturing.

The thin part 400*b* is formed in several locations in the longitudinal direction of the bar material. In more detail, the thin part 400*b* is formed at equal intervals in several locations in the longitudinal direction of the bar material. The thin part 400*b* is formed with a pitch P of about 20 mm to 50 mm (as one example, 30 mm). The thin part 400*b* is formed at about 5 to 15 locations (as one example, 11 locations).

The thin part 400*b* is formed on one surface of the bar material (as one example, the front surface). The thin part 400*b* has a depth D of about 50±10% of the thickness of the bar material (as one example, 47%). The thin part 400*b* is formed over the entire width of the bar material. The thin part 400*b* is a recess. In more detail, the thin part 400*b* is a recess having a V-shaped section. The recess is formed to have the angle of about 40 degrees to 70 degrees (as one example, 53 degrees).

The bar material has an elongated hole 400*c*. The elongated hole 400*c* is formed along the longitudinal direction of the bar material. The elongated hole 400*c* is a straight and elongated hole following along the longitudinal direction of the bar material. The elongated hole 400*c* is a hole which opens piercing through the bar material. Therefore, the bar material includes a pair of parallel divided parts in an elongated hole formation region in the longitudinal direction of the bar material.

The elongated hole 400*c* has the length L of about 50% to 90% of the length (total length) of the bar material (as one example, 70%). The elongated hole 400*c* is formed near one end of the bar material, so that one end in the longitudinal direction of the elongated hole 400*c* is adjacent to the end of the bar material. Therefore, the one end of the bar material becomes a closed end 400*d* where the elongated hole 400*c* does not reach the edge of the bar material. However, when the part of the bar material is broken off, the one end of the bar material becomes an open end 400*e* where the elongated hole 400*c* reaches the edge of the bar material. A predetermined region in the longitudinal direction of the bar material including the other end of the bar material is an elongated hole non-formation region.

The thin part 400*b* is formed in an elongated hole formation region in the longitudinal direction of the bar material. Therefore, the thin part 400*b* is formed at a pair of parallel divided parts. The thin part 400*b* is not formed in the elongated hole non-formation region. However, this is not an indispensable matter.

The elongated hole 400*c* has the width W of about 25% to 60% of the width (total width) of the bar material (as one example, 30%). The elongated hole 400*c* is formed so that the center line in the width direction of the elongated hole 400*c* accords with the center line in the width direction of the bar material.

Figure 10A:
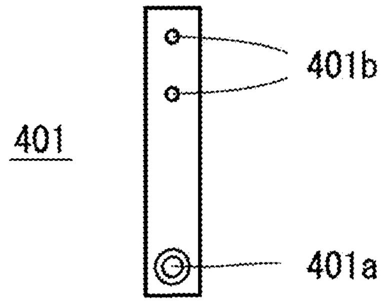
FIG. 10A is a front view showing an end bar of the connection bar.

As shown in FIG. 10A, the end bar 401 is a straight long plate-type flat bar (flat bar). The end bar 401 includes one end (a lower end in the drawing) and the other end (an upper end in the drawing) in the longitudinal direction. The end bar 401 has the width (total width) being the same as the width (total width) of the bar main body 400. The end bar 401 is a member made from metal such as iron, steel, stainless steel, or aluminum as a material. Alternatively, the end bar 401 may be a member made from hard resin.

The one end includes a connection point 401*a* and is rotatably connected to another mechanical element. The connection point 401*a* is a bush fitted into a through hole formed at the one end. The bush has a pin as a rotary shaft inserted thereinto.

The end bar 401 includes a fastening point 401*b*. The fastening point 401*b* is provided at least at two locations in the longitudinal direction of the end bar 401. The fastening point 401*b* is, for example, an internal thread into which a bolt as the fastener 404 is screwed. In this case, the end bar 401 is a plate nut.

Though not illustrated, an end bar 402 also has the same configuration as the end bar 401. However, as shown in FIGS. 7C and 8C, the end bar 402 is shaped to have its midway part appropriately bent at a location, so that the one end is offset with respect to the other end. This offset shape can also be applied to the end bar 401.

As shown in FIGS. 11A, 11B, 12A, and 12B, the bar main body 400 and the end bar 401 are joined by at least two fasteners 404. The fasteners 404 fasten the bar main body 400 and the end bar 401 at locations through the elongated hole 400*c* of the bar main body 400. If fastening points 401*b* of the end bar 401 are internal threads, the bolts as the fasteners 404 are screwed into the internal threads through the elongated hole 400*c*. If necessary, the plurality of shims 405 for adjustment is also inserted between the bar main body 400 and the end bar 401.

Figure 10B:
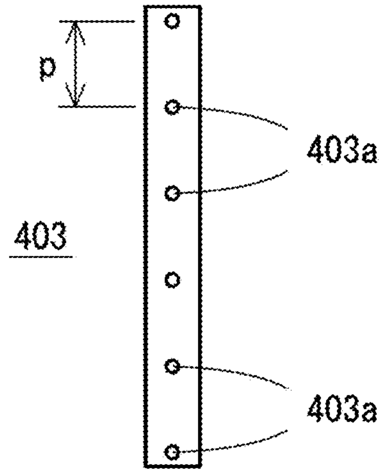
FIG. 10B is a front view showing a reinforcing bar of the connection bar.
Figure 11A:
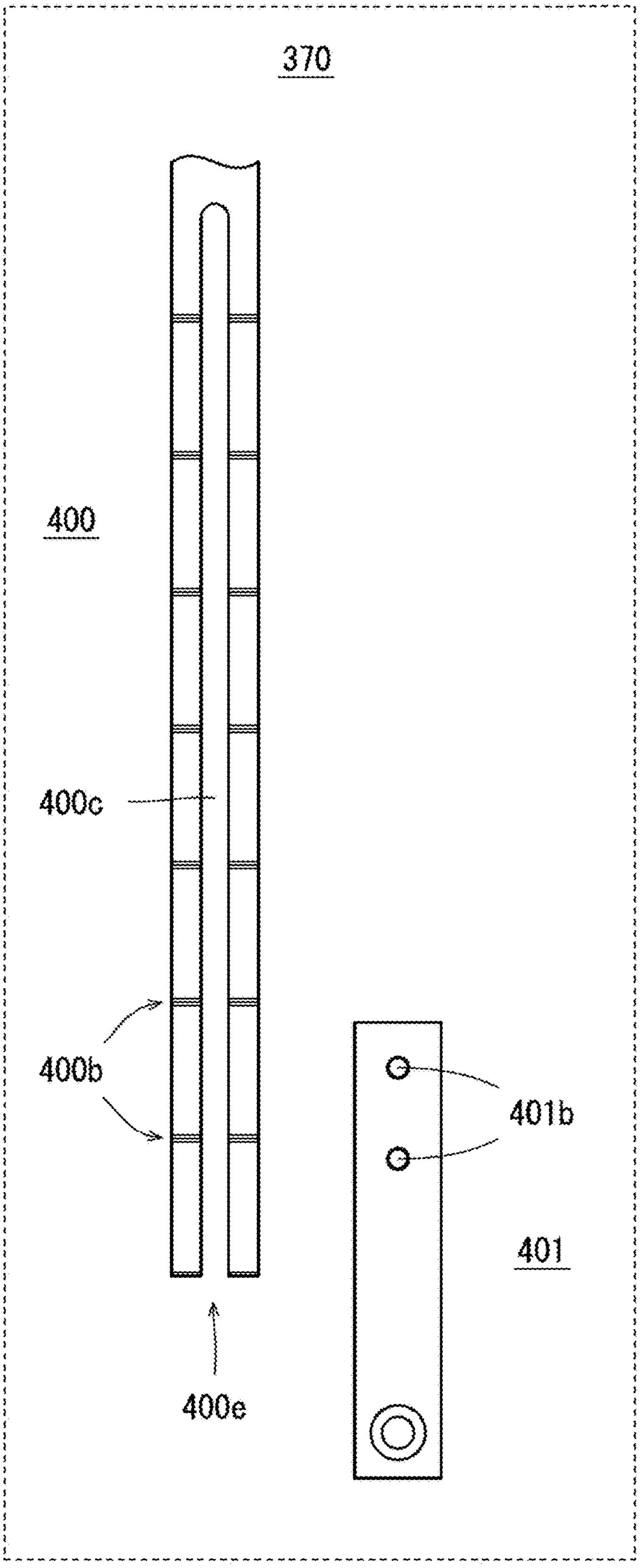
FIG. 11A is an explanative drawing relating to the assembly of the connection bar of the landing door engagement device.
Figure 11B:
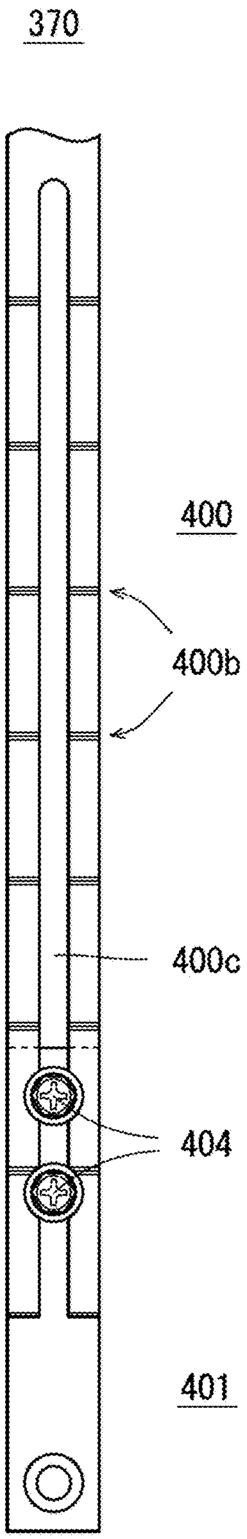
FIG. 11B is an explanative drawing relating to the assembly of the connection bar of the landing door engagement device.

As shown in FIG. 10B, the reinforcing bar 403 is a straight long plate-type flat bar (flat bar). The reinforcing bar 403 includes one end (a lower end in the drawing) and the other end (an upper end in the drawing) in a longitudinal direction. The reinforcing bar 403 has the same width (total width) as the width (total width) of the bar main body 400. The reinforcing bar 403 has the thickness (as one example, 94%) equal to or larger than about 60% of the thickness of the bar main body 400. The reinforcing bar 403 is a member made from metal such as iron, steel, stainless steel, or aluminum as a material. Alternatively, the reinforcing bar 403 may be a member made from hard resin.

The reinforcing bar 403 has a fastening point 403*a*. The fastening point 403*a* is provided at several locations in the longitudinal direction of the reinforcing bar 403. In more detail, the fastening point 403*a* is provided at equal intervals in several locations in the longitudinal direction of the reinforcing bar 403. The fastening point 403*a* is provided with the pitch p (as one example, 30 mm) of about 20 mm to 100 mm. The pitch p of the fastening point 403*a* in the longitudinal direction of the reinforcing bar 403 accords with the pitch P of the thin part 400*b* in the longitudinal direction of the bar main body 400. The fastening point 403*a* is provided at about 3 to 8 locations (as one example, 6 locations). The fastening point 403*a* is, for example, an internal thread into which the bolt as the fastener 404 is screwed. In this case, the reinforcing bar 403 is a plate nut.

Figure 12A:
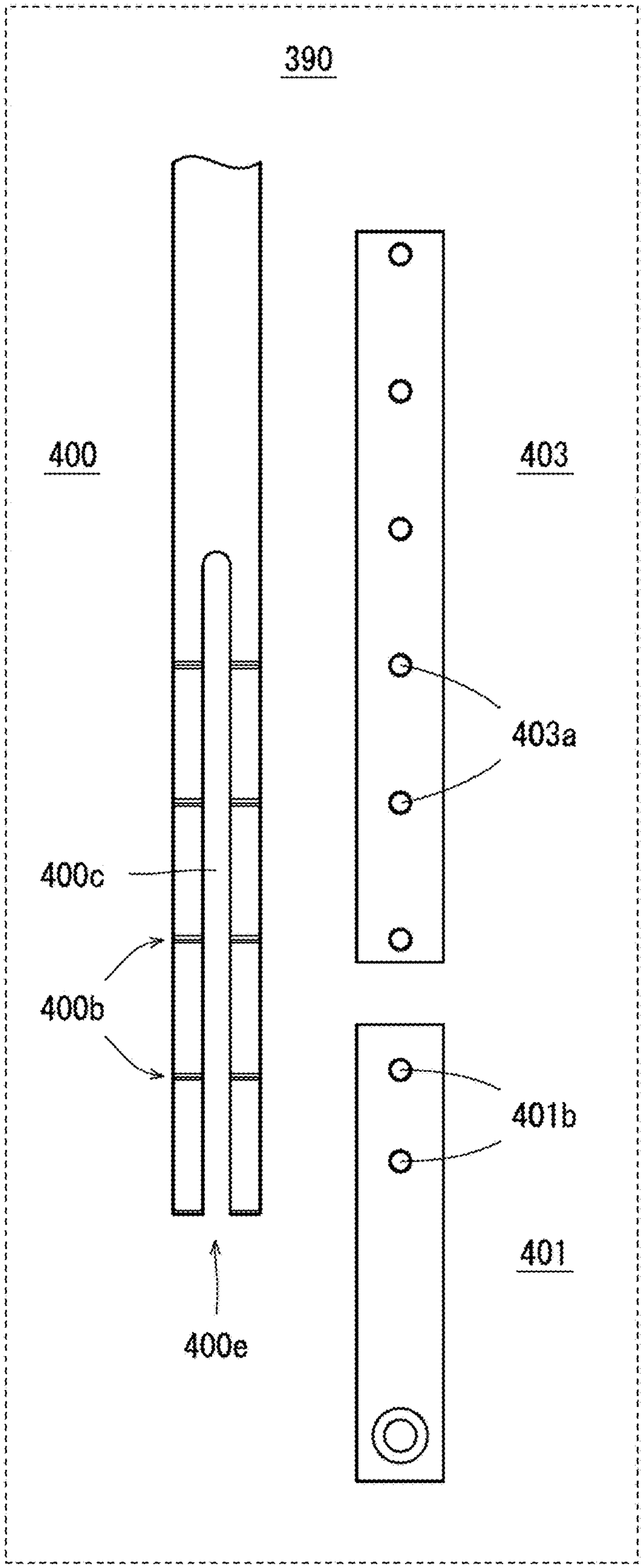
FIG. 12A is an explanative drawing relating to the assembly of the connection bar of the door lock device of the car door.
Figure 12B:
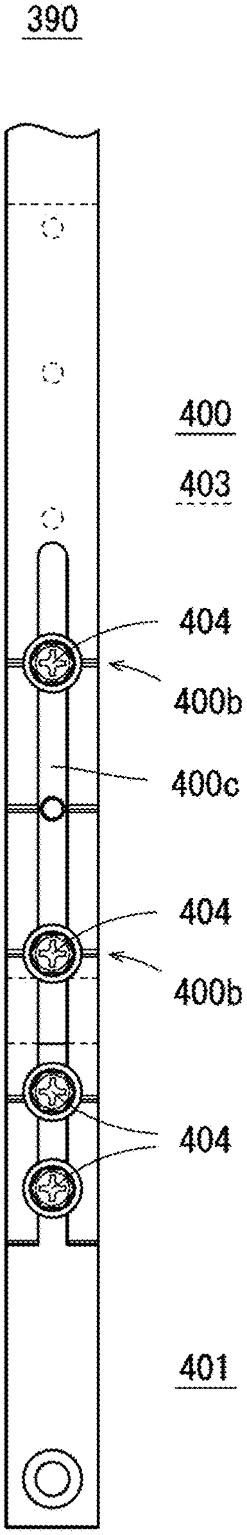
FIG. 12B is an explanative drawing relating to the assembly of the connection bar of the door lock device of the car door.

As shown in FIGS. 12A and 12B, the reinforcing bar 403 is joined to the bar main body 400, so that it supports and abuts against (a portion protruding from the end bar 401 in) a thin part formation region of the bar main body 400. The reinforcing bar 403 is made to support and abut against the surface (as one example, the reverse surface) opposite to the one surface on which the thin part 400*b* is formed, of the two opposing surfaces of the bar main body 400. The reinforcing bar 403 is made to support and abut against the bar main body 400, so that both edges in the width direction of the reinforcing bar 403 accord with both edges in the width direction of the bar main body 400. "Supporting and abutting against" means that a fixed range in the longitudinal direction abuts against something.

The bar main body 400 and the reinforcing bar 403 are joined by at least two fasteners 404. The fasteners 404 fasten the bar main body 400 and the reinforcing bar 403 at locations through the elongated hole 400*c* of the bar main body 400. If fastening points 403*a* of the reinforcing bar 403 are internal threads, the bolts as the fasteners 404 are screwed into the internal threads through the elongated hole 400*c*. At this time, it is preferable that the locations of the thin parts 400*b* of the bar main body 400 and the fastening points 403*a* of the reinforcing bar 403 overlap each other. In this case, the fasteners 404 are to fasten the bar main body 400 at the locations of the thin parts 400*b*, and the heads (or, if any, washers) of the fasteners 404 are made to support and abut against the thin parts 400*b*.

The elevator 1 according to the present embodiment is configured as described above. Next, the operation of the landing door engagement device 36, the door lock device 38 of the car door 31, and the door lock device 28 of the landing door 23 is identical to the one in the prior art and will be briefly explained.

As shown in FIGS. 5 and 6, the first cam 361 as the first engaging body engages with the first roller 27A as the first engaged body when the car door 31 operates to open. When the car door 31 operates to open, the second cam 363 as the second engaging body changes from the first state (see FIG. 5) to the second state (see FIG. 6), engages with the second roller 27B as the second engaged body, and clamps the rollers 27A, 27B together with the first cam 361. In this manner, the landing door 23 operates to open without causing lateral vibrations as the car door 31 operates to open.

Further, when engaging with the first roller 27A, the first cam 361 receives the reaction force from the first roller 27A to changes from the first state (see FIG. 5) to the second state (see FIG. 6), and changes the locking body 382 from the locked state (see FIG. 5) to the unlocked state (see FIG. 6). In this manner, the car door 31 is unlocked and can operate to open.

Further, when the first cam 361 engages with the first roller 27A, as shown in FIGS. 4A and 4B, the first roller 27A changes from the first state (see FIG. 4A) to the second state (see FIG. 4B) and changes the locking body 282 from the locked state (see FIG. 4A) to the unlocked state (see FIG. 4B). In this manner, the landing door 23 is unlocked and can operate to open.

As described above, with the connection bars 370 and 390 according to the present embodiment, the unnecessary part of the bar material is broken off at the thin part 400*b*, so that the length of the bar main body 400 can be changed. Since the break-off work can be carried out on-site, the length of the bar main body 400 can be adjusted on-site. Therefore, with the connection bars 370 and 390 according to the present embodiment, it is possible to provide highly versatile connection bars which can be installed in various locations of the first cam 361 and the second cam 363.

Further, with the connection bars 370 and 390 according to the present embodiment, the thin part 400*b* is formed in several locations in the longitudinal direction of the bar material. Therefore, with the connection bars 370 and 390 according to the present embodiment, fine length adjustment can be performed.

Further, with the connection bars 370 and 390 according to the present embodiment, the thin part 400*b* has a depth of 50±10% of the thickness of the bar material. If the depth is too large, the strength of the bar main body 400 deteriorates and the function as the connection bars 370, 390 may be impaired. However, if the depth is too small, the bar material cannot be cleanly broken off, or a large force is required for breaking it off. With the connection bars 370 and 390 according to the present embodiment, a suitable bar main body 400 can be obtained in consideration of the balance between the strength and the easiness to break off.

Further, with the connection bars 370 and 390 according to the present embodiment, the bar material includes the elongated hole 400*c* formed along the longitudinal direction of the bar material, and the thin part 400*b* is formed in the elongated hole formation regions in the longitudinal direction of the bar material. The length to be broken off becomes shorter by a length of the elongated hole 400*c*. Moreover, a pair of divided parts of the bar material exists on both sides of the elongated hole 400*c* and, due to this, the strength of the bar main body 400 is not impaired. In this manner, with the connection bars 370 and 390 according to the present embodiment, while the strength of the bar main body 400 is maintained, the break-off of the bar main body 400 can be achieved with a comparatively small force in comparison with the case without the elongated hole, so that the length can be easily adjusted.

Further, with the connection bar 390 according to the present embodiment, the bar main body 400 is reinforced by the reinforcing bar 403 and its strength is improved. When the door lock device 38 of the car door 31 operates to achieve the unlocked state, a compression load acts on the connection bar 390. Therefore, since the connection bar 390 has the thin part 400*b*, it is likely to become buckled and broken. However, the reinforcing bar 403 is added so that the bar main body 400 is reinforced. Therefore, with the connection bar 390 according to the present embodiment, the possibility for buckling and breaking can be eliminated. A tension load, and not a compression load, acts on the connection bar 370. Therefore, the reinforcing bar 403 is not especially required. However, it is needless to say that the reinforcing bar 403 can also be applied to the connection bar 370.

Further, when the reinforcing bar 403 is prepared, if the bar material is erroneously shortened or the positions of the first cam 361 and the second cam 363 need to be changed after breaking off a part of the bar material, the length of the connection bar 390 can be extended by using and reconnecting the reinforcing bar 403. Therefore, the present embodiment also exhibits an effect of making arrangements again for components unnecessary.

Further, with the connection bar 390 according to the present embodiment, the reinforcing bar 403 is made to support and abut against the surface opposite to the one surface on which the thin part 400*b* is formed, of the two opposing surfaces of the bar main body 400. The bar main body 400 has the thin part 400*b* on one surface and thus is inevitably easily buckled toward the one surface. The reinforcing bar 403 acts as resistance against this. Therefore, with the connection bar 390 according to the present embodiment, the possibility for buckling and breaking can be eliminated.

Further, with the connection bar 390 according to the present embodiment, the reinforcing bar 403 has a length equal to or larger than the range of the thin part formation region which is shortened after a part of the bar material is broken off. Therefore, with the connection bar 390 according to the present embodiment, the part where the strength is weak can be comprehensively reinforced.

Further, with the connection bar 390 according to the present embodiment, the pitch p of the fastening point 403*a* in the longitudinal direction of the reinforcing bar 403 accords with the pitch P of the thin part 400*b* in the longitudinal direction of the bar main body 400. Therefore, with the connection bar 390 according to the present embodiment, the location of the thin part 400*b* of the bar main body 400 and the location of the fastening point 403*a* of the reinforcing bar 403 are configured to overlap with each other, and the bar main body 400 is fastened by the fastener 404 at the location of the thin part 400*b*, so that the thin part 400*b*, being particularly vulnerable to the buckling, can be reinforced.

The present invention is not limited to the above embodiment, and various modifications are possible as far as they do not deviate from the purpose of the present invention. And the operation and effect of the present invention are not limited to the above embodiments. That is, the embodiments disclosed herein should be considered to be illustrative in all respects and not restrictive. The scope of the present invention is indicated by the appended claims, not by the above description. It is also contemplated that the scope of the present invention includes all modifications within the meaning and scope of equivalence to the claims.

In the above embodiment, the first cam 361 and the second cam 363 as the engaging bodies are provided respectively independently to be capable of moving in parallel, and the connection bars 390, 370 are applied to the respective cams. However, the present invention is not limited to this configuration. Any one of the engaging bodies may be fixed and may have a structure in which the connection bar is not applied to this engaging body. For example, if the door lock device 38 for the car door 31 is not provided, the first cam 361 is fixed and the connection bar 390 is unnecessary. If the landing door engagement device 36 is not provided with a clamping function, the second cam 363 is fixed and the connection bar 370 is unnecessary.

Further, in the above embodiment, a new structure of the connection bar according to the present invention is applied to the connection bar 370 of the landing door engagement device 36 and the connection bar 390 of the door lock device 38 of the car door 31. However, the present invention is not limited to this configuration. The new structure of the connection bar according to the present invention may be applied to the connection bar of the door lock device of the landing door.

Further, in the above embodiment, the connection bar 370 is directly connected to the second cam 363 and the connection bar 390 is directly connected to the first cam 361. However, the present invention is not limited to this configuration. The connection bar may be connected to a parallel link.

Further, in the above embodiment, in the connection bars 370, 390, the bar materials having had a portion thereof broken off are used as the bar main bodies 400. However, the present invention is not limited to this configuration. In the connection bar, the bar material (see FIG. 9A) of which no portion of the bar material is broken off, may be used as-is, as the bar main body.

Further, in the above embodiment, the bar main body 400 (bar material) is a flat member. However, the present invention is not limited to this configuration. The bar main body (bar material) may be a member which is not flat, for example, a member having a circular or elliptic section (round bar or elliptic bar).

Further, in the above embodiment, the thin part 400*b* is the recess having the V-shaped section. However, the present invention is not limited to this configuration. The recess may be a recess assuming a shape other than a V-shaped section, for example, a U-shaped section, etc. Further, the thin part need not be a recess. For example, a plurality of recessed parts may be linearly arranged at intervals.

Further, in the above embodiment, the thin part 400*b* is formed on one surface of the bar main body 400 (bar material). However, the thin part may also be formed on the opposite surface of the bar main body (bar material); namely, on both sides.

Further, in the above embodiment, the thin part 400*b* is formed along a direction orthogonal to the longitudinal direction of the bar main body 400 (bar material). However, the present invention is not limited to this configuration. The thin part may also be formed along a diagonally inclined direction with respect to the direction orthogonal to the longitudinal direction of the bar main body (bar material).

Further, in the above embodiment, the thin part 400*b* is formed over the entire width of the bar main body 400 (bar material). However, the present invention is not limited to this configuration. The thin part, for example, need not reach the side edge of the bar main body (bar material) and the side edge part of the bar main body (bar material) may be a non-formation part of a thin part. Further, for example, the thin part need not reach the side edge of the elongated hole and the side edge part of the elongated hole may be a non-formation part of a thin part.

Further, in the above embodiment, the reinforcing bar 403 is made to support and abut against the surface opposite to the one surface on which the thin part 400*b* is formed, of the two opposing surfaces of the bar main body 400. However, the present invention is not limited to this configuration. The reinforcing bar may be made to support and abut against one surface in which the thin part is formed. Alternatively, two reinforcing bars may be used and may be made to support and abut against both surfaces, so that they sandwich the bar main body.

Further, in the above embodiment, the fastening means for the bar main body 400 and the end bars 401, 402 as well as the fastening means for the bar main body 400 and the reinforcing bar 403 are combinations of bolts and internal threads. However, the present invention is not limited to this configuration. For example, it is also possible that through holes are provided in the end bar and the reinforcing bar in place of the internal threads, and that the fastening means as a combination of bolts and nuts are used. Alternatively, other publicly known fastening means such as rivets may be used.

Further, in the above embodiment, the door devices 30, 22 are of a center opening type (2CO) using one door on each left and right side. However, the present invention is not limited to this configuration. Needless to say, the present invention can be applied to a door device of a side opening type (2S) using two doors, a door device of the center opening type (4CO) using two doors on each left and right side, and a door device of a side opening type (1S) using one door.

Unless physically interfering with each other, it is naturally possible that, for example, the above-described technical elements are applied to other embodiments or examples, the above-described technical elements are replaced with technical elements relating to other embodiments or examples, and the above-described technical elements are combined with each other, and this is naturally intended by the present invention.

The invention claimed is:

1. A car door device for an elevator, comprising:

a car door moving laterally to open and close an opening of a car;

an engaging body engaging with an engaged body of a landing door when the car door moves, the engaging body being movably provided between a first state and second state; and a connection bar for operatively connecting the engaging body with another mechanical element, wherein the connection bar includes a bar main body; and a bar material is used as the bar main body, where the bar material is provided, in at least one location in a longitudinal direction, with a thin part formed along a direction crossing the longitudinal direction, so that a portion of the bar material can be broken off; and the thin part has a depth of 50±10% of a thickness of the bar material.

2. The car door device according to claim 1, wherein the thin part is formed at several locations in the longitudinal direction of the bar material.

3. The car door device according to claim 2, wherein the thin part is formed at equal intervals in several locations in the longitudinal direction of the bar material.

4. The car door device according to claim 2, wherein the connection bar includes a reinforcing bar joined to the bar main body so that the reinforcing bar is made to support and abut against a thin part formation region in the longitudinal direction of the bar main body.

5. The car door device according to claim 4, wherein the bar main body and the reinforcing bar are plate-type members, the thin part is formed on one surface of the bar main body, and the reinforcing bar is made to support and abut against a reverse surface of the bar main body.

6. The car door device according to claim 4, wherein the thin part is formed at equal intervals in several locations in the longitudinal direction of the bar main body, the reinforcing bar includes fastening points at equal intervals in several locations in the longitudinal direction of the reinforcing bar, a pitch of the fastening points in the longitudinal direction of the reinforcing bar accords with a pitch of the thin part in the longitudinal direction of the bar main body, and the bar main body and the reinforcing bar are joined by at least two fasteners.

7. The car door device according to claim 4, wherein, when the engaging body moves, a compression load acts on the connection bar.

8. The car door device according to claim 4, wherein the reinforcing bar has a width equal to a width of the bar main body.

9. The car door device according to claim 1, wherein the thin part is a recess.

10. An elevator, comprising:

a car door device according to claim 1.

11. A car door device for an elevator, comprising:

a car door moving laterally to open and close an opening of a car;

an engaging body engaging with an engaged body of a landing door when the car door moves, the engaging body being movably provided between a first state and second state; and a connection bar for operatively connecting the engaging body with another mechanical element, wherein the connection bar includes a bar main body;

a bar material is used as the bar main body, where the bar material is provided, in at least one location in a longitudinal direction, with a thin part formed along a direction crossing the longitudinal direction, so that a portion of the bar material can be broken off; and the thin part is formed over (i) an entire width of the bar material or (ii) the entire width of the bar material excluding a side edge of the bar material.

12. An elevator, comprising:

a car door device according to claim 11.

13. A car door device according to claim 7, comprising:

a car door moving laterally to open and close an opening of a car;

an engaging body engaging with an engaged body of a landing door when the car door moves, the engaging body being movably provided between a first state and second state; and a connection bar for operatively connecting the engaging body with another mechanical element, wherein the connection bar includes a bar main body;

a bar material is used as the bar main body, where the bar material is provided, in at least one location in a longitudinal direction, with a thin part formed along a direction crossing the longitudinal direction, so that a portion of the bar material can be broken off;

the bar material has an elongated hole formed along the longitudinal direction of the bar material;

the thin part is formed in an elongated hole formation region in the longitudinal direction of the bar material; and the elongated hole has a length equal to or larger than 50% of a length of the bar material.

14. The car door device according to claim 8, wherein the elongated hole is formed near one end of the bar material, and a predetermined region in the longitudinal direction of the bar material including the other end of the bar material is an elongated hole non-formation region.

15. The car door device according to claim 8, wherein the elongated hole has a width of 25% to 60% of a width of the bar material.

16. The car door device according to claim 8, wherein the elongated hole is formed so that a center line in a width direction of the elongated hole accords with a center line in a width direction of the bar material.

17. The car door device according to claim 8, wherein one end of the bar main body is an open end where the elongated hole reaches an edge of the bar main body.

18. The car door device according to claim 8, wherein one end of the bar main body is a closed end where the elongated hole does not reach an edge of the bar main body.

19. An elevator, comprising:

a car door according to claim 13.

* * * * *